US009666177B2

(12) United States Patent
Van Raalte et al.

(10) Patent No.: US 9,666,177 B2
(45) Date of Patent: May 30, 2017

(54) AUDIO SYSTEM, METHOD FOR GENERATING AN AUDIO SIGNAL, COMPUTER PROGRAM AND AUDIO SIGNAL

(75) Inventors: Steven Van Raalte, Terheijden (NL); Ronnie Duisters, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 667 days.

(21) Appl. No.: 13/516,025

(22) PCT Filed: Dec. 16, 2009

(86) PCT No.: PCT/EP2009/067327
§ 371 (c)(1), (2), (4) Date: Aug. 17, 2012

(87) PCT Pub. No.: WO2011/072737
PCT Pub. Date: Jun. 23, 2011

(65) Prior Publication Data
US 2013/0034244 A1 Feb. 7, 2013

(51) Int. Cl.
*G10K 15/04* (2006.01)
*G08B 13/24* (2006.01)
*H04M 3/12* (2006.01)

(52) U.S. Cl.
CPC .................................... *G10K 15/04* (2013.01)

(58) Field of Classification Search
CPC ...................................................... G10K 15/04
USPC ............................ 381/97, 98, 312, 316, 320
See application file for complete search history.

(56) References Cited

U.S. PATENT DOCUMENTS

| | | | | |
|---|---|---|---|---|
| 3,504,364 | A | 3/1970 | Abel | |
| 4,473,821 | A * | 9/1984 | Yang | G08B 25/016 340/13.28 |
| 7,089,176 | B2 | 8/2006 | Boillot et al. | |
| 8,300,840 | B1 * | 10/2012 | Frye | H04R 29/00 381/313 |
| 2003/0086577 | A1 | 5/2003 | Lee | |
| 2009/0310710 | A1 * | 12/2009 | Farrokhi | H04L 27/2621 375/302 |

FOREIGN PATENT DOCUMENTS

| | | |
|---|---|---|
| JP | 58080910 | 5/1983 |
| WO | 0026898 | 5/2000 |

OTHER PUBLICATIONS

PCT/EP2009/067327 International Search Report dated Oct. 8, 2010 (2 pages).

* cited by examiner

*Primary Examiner* — Duc Nguyen
*Assistant Examiner* — Yogeshkumar Patel
(74) *Attorney, Agent, or Firm* — Michael Best & Friedrich LLP

(57) ABSTRACT

The invention relates to an audio system for generating an audio signal. More specifically the invention relates to an audio system, especially an audio alarm system, for generating an audio signal comprising means for generating a component of the audio signal at a base frequency and means for generating further components of the audio signal at other frequencies than the base frequency, whereby the base and the other frequencies are separated from each other by separating frequency bands in order to enhance the loudness of the audio signal. The invention furthermore relates to a method for generating an audio signal, a computer program and an audio signal.

17 Claims, 3 Drawing Sheets

Figure 1:
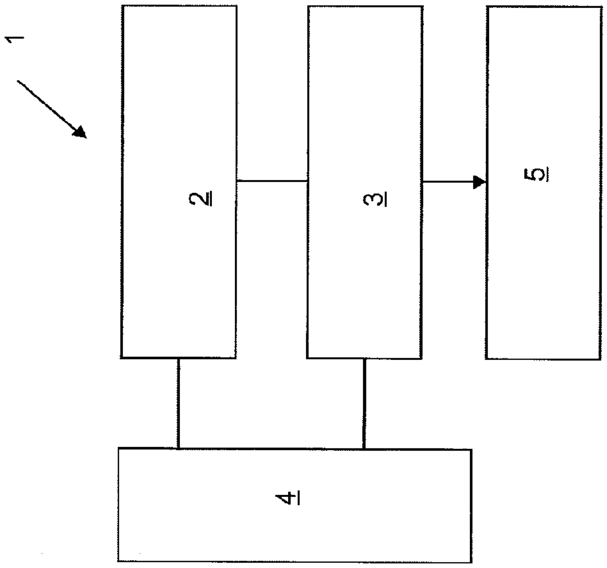

AUDIO SYSTEM, METHOD FOR GENERATING AN AUDIO SIGNAL, COMPUTER PROGRAM AND AUDIO SIGNAL

STATE OF THE ART

The invention relates to an audio system for generating an audio signal. More specifically the invention relates to an audio system, especially an audio alarm system, for generating an audio signal comprising means for generating a component of the audio signal at a base frequency and means for generating further components of the audio signal at other frequencies than the base frequency, whereby the base and the other frequencies are separated from each other by separating frequency bands in order to enhance the loudness of the audio signal. The invention furthermore relates to a method for generating an audio signal, a computer program and an audio signal.

Alarm sounds are indispensable for example for the safety in public buildings. The alarms sounds have the function to inform the persons in the surroundings about a dangerous situation. Alarm sounds should be audible throughout the building also in the presence of background noise and should therefore satisfy a plurality of regulations.

The alarm sounds are often provided by public address systems, which are adapted to fulfil the said regulations. The manufacturers of the public address systems are primarily interested to fulfil the regulations and to give security to the persons warned by the public address system. But with a view to production costs of such public address systems, the manufactures are additionally interested in keeping the costs for the components of the system low. Especially the amplifiers are cost-driving components, whereby the costs increase together with the maximum output power of the amplifiers. Thus it is a desire in the art, to provide alarm sounds, which conform with the regulations on the one hand side and which do not need an exceeding maximum output power of the amplifiers on the other hand side. The same reasoning applies to the required power handling capacity of the loudspeakers. Loudspeakers with a lower maximum power handling capacity are cheaper than high power loudspeakers and if less RMS power is needed to generate an alarm sound that complies to the regulations, system cost will decrease.

Furthermore, such public address systems often need battery based backup power supplies. Many standards require that an emergency sound system should be able to generate an alarm tone continuously for at least 30 minutes on its backup power supply. Then the backup battery accounts for a substantial part of the system cost. A lower amplifier output power for an equally loud alarm sound reduces the size and cost of the backup battery.

From psychoacoustics it is known that for increasing the loudness of a signal, signal components should be distributed over the audible spectrum as much as possible in non-overlapping critical bands. This scientific knowledge in combination with alarm tones has been exploited to some extent in some patents, e.g. U.S. Pat. No. 3,504,364 or U.S. Pat. No. 7,089,176, which represent the closest prior art.

DISCLOSURE OF THE INVENTION

The invention relates to an audio system with the features of claim 1, to a method for generating an audio signal with the features of claim 10, to a computer program with the features of claim 11 and to an audio signal with the features of the claim 12. Preferred embodiments of the invention are disclosed by the dependent claims, the description and the figures.

Thus the invention relates to an audio system, which is preferably adapted and/or operable to generate an audio signal, especially an alarm audio signal. The audio signal or the major parts thereof is/are within the audible frequency spectrum, for example between 200 Hz and 8 kHz. The audio signal is preferably embodied as an artificial tone, for example a siren tone or a constant tone.

Having a look at the frequency distribution of the audio signal, the audio signal comprises a component of the audio signal with a base frequency. Preferably this component carries the information content of the audio signal. As it will be explained later, this component may be a fixed-frequency signal or a frequency sweep, so that the base frequency is a time-dependent function f(t). The base frequency may be the lowest frequency in the audio signal or may be arranged arbitrarily or user defined for example in the middle of the frequency distribution.

The audio system comprises means for generating the component of the audio signal at the base frequency and means for generating further components of the audio signal at other frequencies than the base frequency. In order to enhance the loudness of the audio signal, the components are separated from each in such a way that they are in separate so-called critical frequency bands being separated from each other by separating bands. The separating bands may be realized as hard blocking bands, in other embodiments, the amplitudes of the audio signal in the separating frequency bands are very small compared for example to the amplitude of the audio signal at the base frequency.

According to the invention it is proposed that the audio system comprises means for defining and/or controlling the phase relations of the components of the audio signal at the base frequency as well as at the other frequencies.

It is one finding of the invention that the phase relations is a parameter-set, which does not influence the RMS, the root-mean-square value. When the frequency components of the signal are in different critical bands, then the loudness of the audio signal is not influenced either. So changing of the phase relations does not disturb the technical or audible features of the audio signal. But changing the phase relations allows to modify the so-called Crest factor, so that the audio signal can be adapted to the amplifier characteristics, making it for example possible to increase the maximum output level of the amplifier for the same power supply voltage. Alternatively, the Crest factor can be optimized to use the amplifier at its maximum efficiency. Especially the efficiency of amplifiers operating is class AB, class G and class H is very signal level dependent.

In the following, some definitions are given concerning the terms RMS, Crest-factor etc. It shall be noted that the definitions are only hints to understand the general concept of the invention and shall—preferably—not limit the scope of the terms.

A simplified basic signal $s\mathbf{0}(t)$ as single sinusoid with amplitude a0 and frequency f0 is given as follows:

$$s_0(t)=a_0 \sin(2\pi f_0 t)$$

The root-mean-square (RMS) value of the single sinusoid is given by:

$$\text{RMS} = \sqrt{\overline{s_0^2(t)}} = \sqrt{\frac{a_0^2}{2}}$$

The RMS-value of a tone complex comprising a plurality of sinusoids as components, whereby the components are N harmonics of the frequency f0 is given by:

$$\mathrm{RMS} = \sqrt{\overline{s^2_{0\to N-1}(t)}} = \sqrt{\frac{a_0^2}{2} + \frac{a_1^2}{2} + \frac{a_2^2}{2} + \frac{a_3^2}{2} + \frac{a_4^2}{2} + \dots + \frac{a_{N-1}^2}{2}}$$

The Crest factor is of the audio signal is defined as the peak value of the audio signal divided by the root-mean-square (RMS) value of the audio signal. For a continuous time domain signal s(t) with period T, the Crest factor is given by:

$$\mathrm{Crest} = \frac{\max_{t\in[0\ \dots\ T)} |s(t)|}{\sqrt{\frac{1}{T}\int_{t=0}^{T} s^2(t)dt}}$$

The Crest factor for a pure sinusoid is $\sqrt{2}$.

In a preferred embodiment of the invention the phase relations are selected to decrease and/or minimize the Crest factor of the audio signal for example compared to a reference audio signal having equal phase values for all components (e.g. all phases zero). The decrease can be obtained by lowering the peak of the tone complex by individually adjusting the phase of each of the components. The audio signal with a plurality of further frequencies are given by:

$$s(t)=\Sigma_{i\in H} a_i \sin(2\pi i f_0 t+\phi_i)$$

The person skilled in the art is able to find algorithms for decreasing or minimizing the Crest factor by adjusting the phase of each component. For example an iterative algorithm could be used. In a crude manner, it is also possible to generate large amounts of random phases and select the set that generates the lowest Crest factor.

In order to draw a measurable limit a preferred embodiment of the invention is defined by incorporating a Crest factor of the audio signal, which is less than 80%, especially less than 60% and especially less than 40% of a Crest factor of an reference audio signal having the maximum Crest factor and/or whereby all components have the equal phase. Another possible measurable limit is that the Crest factor of the component at the base frequency is lower than the Crest factor of the complete audio signal. Preferably the Crest factor of the component at the base frequency is less than 80%, especially less than 60% and especially less than 40% of the Crest factor of the complete audio signal.

In a preferred embodiment of the invention the further frequencies are harmonics of the base frequency. In this connection it is possible, that the harmonics are successive harmonics or that only some harmonics are selected as the other frequencies. Preferably only harmonics are considered that are integer multiples of the base frequency, as this will not change the perceived pitch of the alarm signal and will not introduce beatings.

Preferably an upper frequency limit fmax for the added harmonics is set. The advantage of such an upper frequency is, that the frequency spectrum can be kept within the audible spectrum and no headroom or power is wasted on less audible frequency components. For public address systems, it could optionally be taken into account that not only the average or median human healthy hearing system could be considered, but that people of all ages should be able to hear the audio signal well. The upper frequency limit of hearing decreases with increasing age. A preferred choice for the upper frequency limit would be 8 kHz.

By using certain harmonics of the base frequency as the other frequencies it can be ensured that the other frequencies are non-overlapping and/or are separated by separating frequency bands.

But again psychoacoustic effects are preferably respected by a further development of the invention. It is known that the human hearing does not hear a single frequency of an audio signal, but a broadened frequency band. The equivalent rectangular bandwidth or ERB is a measure used in psychoacoustics, which gives an approximation to the bandwidths of the filters in human hearing, using the simplification of modeling the filters as rectangular band-pass filters. The formula for a certain centre frequency fc in [Hz] is:

$$ERB(f) = 24.7\left(\frac{4.37\cdot f_c}{1000}+1\right)$$

Optionally the auditory filter may comprise a correction term taking the age of target persons into account. It is known that the bandwidth of the auditory filter broadens with increasing age. A rule of thumb is that the equivalent rectangular bandwidth (ERB) is approximately 11% of the centre frequency at the age of 20 and increases with 2% for every decade. This will influence the loudness perception of the target person.

In the further development the harmonics are selected, so that frequency bands resulting from the harmonics broadened by the auditory filter are also non-overlapping. A possible implementation of this further development is realised by the following script, which can be executed for example on a MATLAB system, which returns the harmonics of the base frequency f:

```
function h=getharmonics(f)
fmax=8e3;
m=1;
n=1;
lastn=1;
ERBw1=24.7*(4.37*f/1000+1);
ERBw2=24.7*(4.37*2*f/1000+1);
while n*f<fmax,
if lastn*f+0.5*ERBw1<(n+1)*f-0.5*ERBw2
h(m)=n;
m=m+1;
lastn=n+1;
end
n=n+1;
ERBw1=24.7*(4.37*lastn*f/1000+1);
ERBw2=24.7*(4.37*(n+1)*f/1000+1);
end
```

Beside the analytical approach of defining the further components it could also be contemplated to use a look-up table approach, whereby only one of the further components per interval of the so called bark scale is allowed. The scale of the bark scale ranges from 1 to 24 and corresponds to the first 24 critical bands of hearing. The subsequent band edges are (in Hz) 20, 100, 200, 300, 400, 510, 630, 770, 920, 1080, 1270, 1480, 1720, 2000, 2320, 2700, 3150, 3700, 4400, 5300, 6400, 7700, 9500, 12000, 15500.

In yet a further development it is proposed that the audio system is adapted to generate the audio signal on basis of a time dependent base frequency f(t). For example, many alarm sounds consist of a frequency sweep. During the sweep, the amount and location of the harmonics may change due to the changing base frequency. This could lead to loudness discontinuities and artefacts in the audio signal. It is proposed to solve the issue by taking a fixed amount of harmonics. For example the number of harmonics is smaller than 20, preferably smaller than 12 and especially smaller than 8 harmonics.

As the position and the number of harmonics are more critical to define for higher frequencies than for lower frequencies it is preferred that the highest frequency of the time dependent base frequency defines the selection and the number of the harmonics, for example by using the script as listed before. Thus the highest base frequency in the sweep defines the maximum amount of harmonics. Next the harmonic numbers of the lowest base frequency are matched with the harmonic numbers of the highest base frequency and the matching numbers are selected as the harmonics for the sweep. It shall be underlined that the result of this selection process may be a sequenced or a non-sequenced series of harmonics.

A further subject-matter of the invention is a method with the features of claim 10, preferably carried out on the audio system as described before, a computer-program with the features of claim 11 and an audio signal with the features of claim 12.

Figure 2:
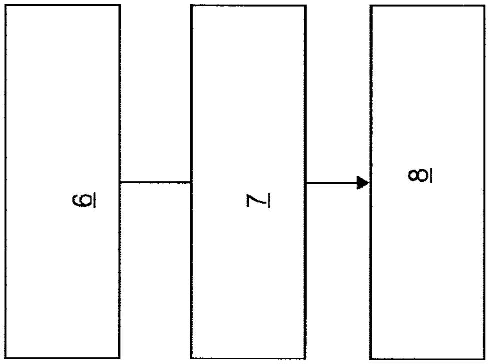
Figure 3:
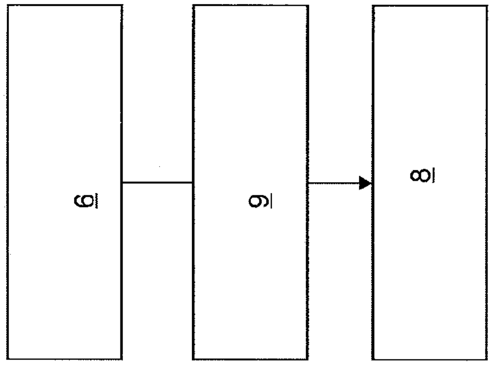
Figure 4:
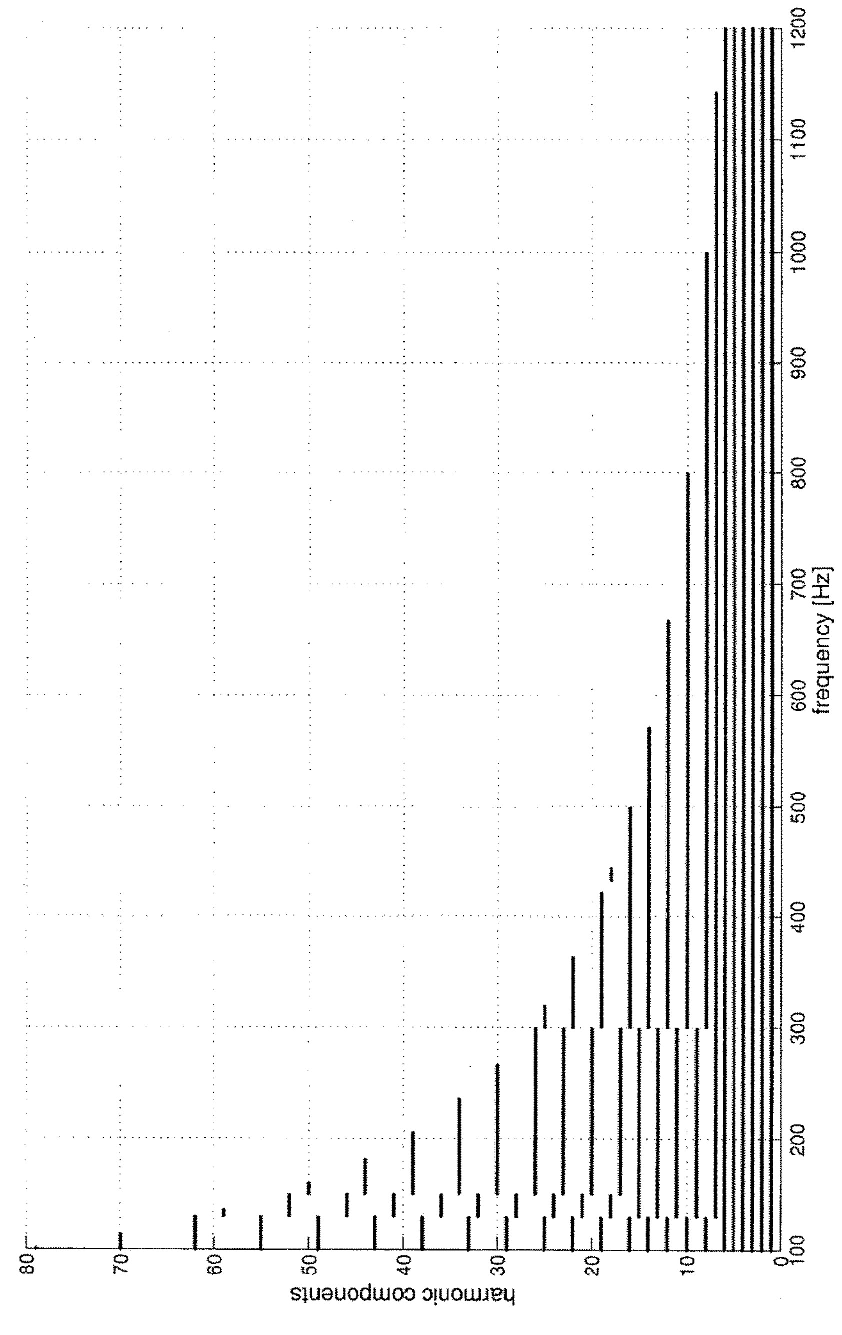

Further features, effects and advantages will become apparent by the detailed description and the figures of embodiments of the invention. The figures show:

FIG. 1 a block diagram illustrating an audio system as an embodiment of the invention;

FIG. 2 a flow diagram illustrating a method for generating an audio signal on basis of a fixed frequency tone according to the invention;

FIG. 3 a flow diagram illustrating a method for generating an audio signal on basis of a frequency sweep tone frequency tone according to the invention;

FIG. 4 a graph showing the distribution of valid harmonics versus possible base frequencies.

Figure 5:
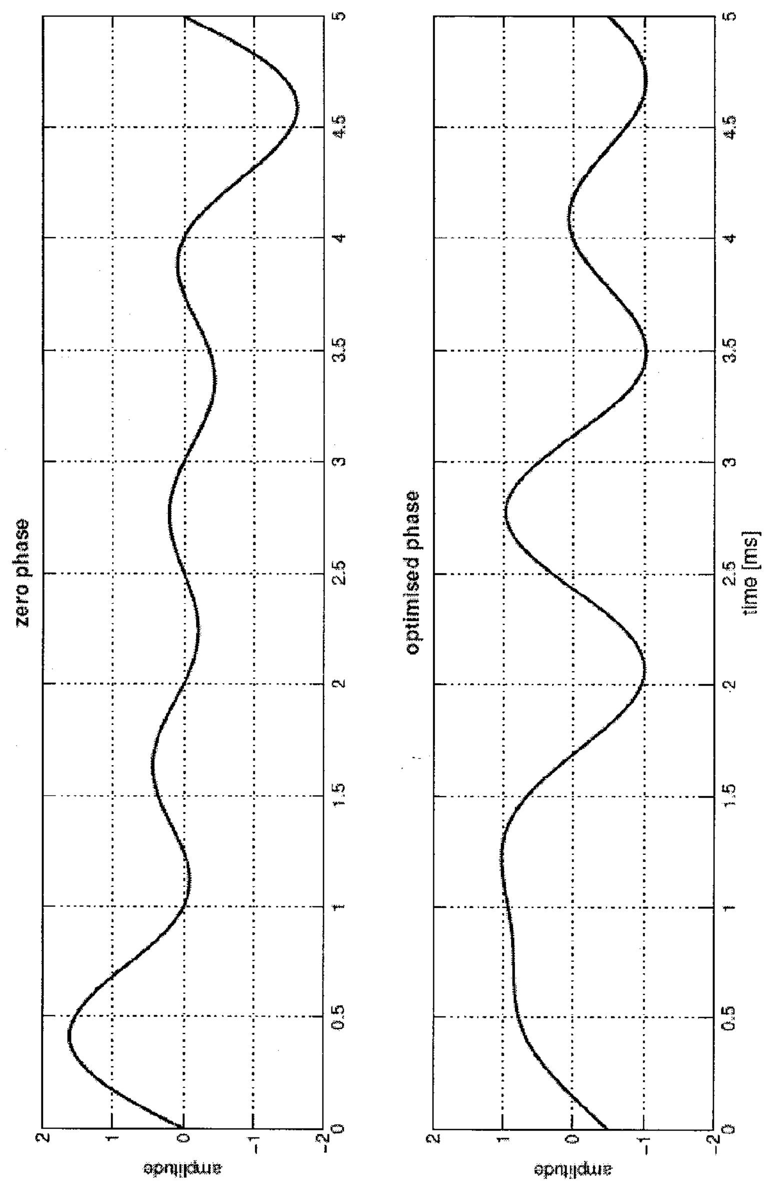

FIG. 5 is a graph of a zero phase signal having a high Crest factor and a graph of an optimized phase signal having a low Crest factor.

FIG. 1 shows a block diagram of an audio system 1 for generating an alarm signal. Such alarm signals are for example used in connection with public address systems. The audio system 1 comprises a module 2 for generating a component of the alarm signal at a base frequency and a module 3 for generating further components of the alarm signal at other frequencies. A controlling module 4 is operable to control the modules 2 and 3, so that the resulting alarm signal has specific properties leading to advantages, when the alarm signal is fed into an amplifier 5.

FIG. 2 illustrates the method of generating the alarm signal with the specific properties. The resulting audio signal is constructed starting at step 6 with a signal with a fixed base frequency f, which represents a first component of the alarm signal.

In a next step 7, harmonics to the base frequency f are determined, which form further components of the alarm signal. The harmonics are integer multiples of the base frequency f, as this will not change the perceived pitch of the alarm sound and will not introduce beatings.

As the auditory filter of the listeners of the alarm signal broadens the harmonics to harmonic bands, the harmonics are selected, so that the said harmonics bands are non-overlapping in order to allow a high loudness of the resulting alarm signal The auditory filter may be represented as the ERB-Filter as explained before and may additionally have the correction term for the decreasing hearing ability of the listeners with age.

A next point is that the audible spectrum is also restricted concerning the frequency range, so it is preferred to use an upper frequency fmax limit which cuts components, which cannot be heard at all or only ineffectively heard by the listeners. A possible upper frequency fmax is 8 kHz.

After the steps 6 and 7 the alarm signal is defined concerning the RMS and the loudness. In step 8 the phase relations of the components, i.e. the signal at base frequency and at the harmonics, are set. As already disclosed in the description, the phase relations are set so that the Crest factor of the alarm signal is decreased or minimised. This variable Crest factor enables an optimal match for the alarm signal and the applied amplifier, as the power efficiency of a certain type of amplifier depends on the level of the signal and its Crest factor. The new alarm signal now generates a higher perceived loudness for the same RMS power consumption as the pure tone alarm; for arbitrary phase values of its components it will sound the same and has the same perceived loudness and it can have certain Crest factor (within certain bounds) by manipulating the phase values for its components, which helps to fit the signal in the specifications of the amplifier.

A further advantage of using multiple frequency components over a pure tone is that people with hearing disabilities in a certain frequency range will still notice the alarm tone or attention signal if not all of the frequency components fall within that problematic frequency range.

Also, in case a masking background noise is present in a certain frequency range, e.g. from machines in operation, the alarm signal might still be heard, while a pure tone within that frequency range could go unnoticed.

Decreasing the Crest factor is especially beneficial in connection with class AB, class G and class H amplifiers as the amplifier 5 in FIG. 1. The selection of the harmonics and of the phase relations is performed by the controlling module 4.

FIG. 3 illustrates a method for generating the alarm signal for a base signal with a time-dependent frequency f(t) as the base frequency. Again in step 6 a base signal is defined, representing for example a frequency sweep or a siren.

In a next step 9, the maximum or a critical frequency of the base signal is determined and the harmonics are calculated in a similar manner as described in connection with the last figure. As a difference to the last figure, the harmonics are calculated for the maximum or critical frequency of the base signal, as this frequency defines the maximum amount of harmonics. The rationale for this solution is given in FIG. 4 where the selected harmonics are given as a function of base frequency. In this figure, the upper frequency limit for the harmonic components is 8 kHz. For all considered frequencies, the harmonic content is quite constant over considerably wide bandwidths. In some embodiments, the number of harmonics is restricted to less than 10. After the selection of the harmonics, the phase relations are adapted in step 8 as described in connection with FIG. 2.

Another way of generating this tone or sweep signal is not to generate harmonics in a separate stage at the moment of playback, but to carefully define a signal consisting of a base frequency with selected harmonics with the optimum amplitude and phase relations. Then generate a samples wavetable for this artificial signal that is read from memory with a fixed or variable speed.

The way that an amplifier copes with signals with various Crest factors depends on the working principle of the amplifier.

A class D amplifier, for instance, has a high efficiency (typically above 90%) and the efficiency will not change much for an output signal with a low Crest factor or a high Crest factor. But a low Crest factor allows for a higher level output signal before clipping occurs when the output voltage peaks are close to the supply voltage(s).

The situation is different for a class AB or class B amplifier. If the idle current of a class AB amplifier is neglected and it is just considered as a class B amplifier, the class B amplifier has an efficiency that is a function of the output voltage as a fraction of the maximum output voltage. Theoretically, for a pure sine wave, the maximum efficiency is reached when the output voltage is equal to the maximum output voltage (clipping level). Then the efficiency is $\pi/4$, or 78.5%. The efficiency decreases linearly with the modulation index of the output signal $k=U_{out\ peak}/U_{supply}$. So for efficiency reasons it is good to have a maximum modulation (k=1) and drive the amplifier close to clipping with a signal having a low Crest factor. This will produce the highest rms output power.

But in many cases a class B amplifier is designed for having a high peak output power that can only be delivered for a short moment and a much lower output power that can be delivered continuously. The power supply and the heatsinks of the amplifier are scaled down for cost reasons. This is a valid design objective as the Crest factor of music and speech signal is typically quite high, around 15 dB. The power supply and the heatsinks of the amplifier are designed to match the maximum rms power of a typical music/speech signal, while the supply voltages of the amplifier are designed to a value that matches the peak output power that the amplifier should deliver. If such an amplifier is used, a continuous alarm tone can only be delivered at a level that matches the continuous rms output power of the amplifier, or lower. In such a case it might be useful to modify the wave shape of the alarm tone to have a high Crest factor in order to minimize the amplifier dissipation. Although the efficiency of class B amplifiers increases with the modulation index k to the already mentioned $\pi/4$ for k=1, the dissipation of a class B amplifier reaches a maximum for $k=2/\pi=0.637$. So, from the point of view of minimizing the amplifier dissipation for the same rms output power, it can be useful to keep the signal level of the alarm tone low (k<<0.637) for most of the time, with only short periodic peaks (k>0.637). In this way the signal traverses just briefly through the high dissipation area.

Another class of amplifier that is often used is the class G amplifier. This type of amplifier uses multiple power supply voltages and the amplifier is designed in such a way that the lower supply voltage(s) are used as long as the output signal is small enough to avoid clipping and the higher supply voltage(s) are used for an output signal that exceed the limits of the lower supply voltage(s). Most class G amplifiers use two or three levels of supply voltage. In case of two levels the lower voltage is often ⅓ or ½ of the higher voltage (n=⅓ or n=½). This type of amplifier typically has a significantly higher efficiency than a class B amplifier that would only have the highest supply voltages for the same maximum output power. For example see *Highest Efficiency And Super Quality Audio Amplifier Using MOS Power Fets In Class G Operation*, IEEE Transactions on Consumer Electronics, Vol. CE-24, No. 3, August 1978, and *Average Efficiency Of Class-G Power Amplifiers*, IEEE Transactions on Consumer Electronics, Vol. CE-32, No. 2, May 1986. For a class G amplifier it is very beneficial to make the Crest factor of an alarm signal low and keep the peak output voltage just below the level of the lower supply voltage. In this way a high efficiency can be achieved and low dissipation. Would the Crest factor be a little higher for the same rms level, then k increases and the amplifier would move to the higher power supply voltage and dissipation would increase rapidly, although the loudness of the signal would remain the same.

As an example FIG. 5 shows two signals, whereby the signal with the low Crest factor (indicated as optimized phase) has a Crest factor of 3.2 dB, the signal with the high Crest factor (indicated as zero phase) has a Crest factor of 7.2 dB. This signal comprises 4 sine waves, one base frequency and the first 3 harmonics. Though the waveforms are clearly different and obviously have a different Crest factor these two complexes sound the same. The notation in dB is derived by the formula $Crest_{dB}=10*\log(Crest^2)$.

A further point to mention is the use of a so-called A-weighting filter that is used when the sound pressure level (SPL) is measured during commissioning of the system. Compared to a single sine wave the more complex tones with harmonics will give a higher reading for the same rms level, because more emphasis is put on the harmonics between 800 Hz and 8 kHz, compared to the typical base frequency that is between 300 Hz and 800 Hz. This may be important because during commissioning the actual measured SPL level decides whether the system complies, not the perceived loudness of the alarm tone. Unfortunately the measurements do not fully reflect the actual gain of the complex alarm tones because they do not take into account the loudness models of the human hearing system.

The invention claimed is:

1. An audio system (1) for generating an audio signal comprising:

a first module configured to generate a component of the audio signal at a base frequency, a second module configured to generate further components of the audio signal at other frequencies than the base frequency, whereby the base and the other frequencies are separated from each other by separating frequency bands in order to enhance the loudness of the audio signal, characterized by a controlling module configured to select the phase relations of the components of the audio signal at each of the base frequency and other frequencies to decrease a Crest factor of the audio signal based on a Crest factor of a reference audio signal wherein all components of the reference audio signal have equal phase.

2. The audio system (1) according to claim 1, characterized in that the decreased Crest factor is less than 80% of the Crest factor of the reference audio signal.

3. The audio system (1) according to claim 1, characterized in that the further frequencies are harmonics of the base frequency.

4. The audio system (1) according to claim 1, characterized in that the separating frequency bands are determined by evaluating an auditory filter at the base frequency and the other frequencies, whereby the auditory filter assigns a bandwidth to each frequency, turning each frequency into a frequency band, whereby the frequency bands are arranged non-overlapping.

5. The audio system (1) according to claim 4, characterised in that the auditory filter is realised as an equivalent rectangular bandwidth (ERB) filter.

6. The audio system (1) according to claim 1, characterised in that all frequencies are arranged in the audible spectrum.

7. The audio system (1) according to claim 1, characterised in that the value of the base frequency is time dependent.

8. The audio system (1) according to claim 7, characterised in that the highest frequency value of the time dependent base frequency defines the maximum amount of harmonic numbers for the further components of the audio signal.

9. A method for generating an audio signal, the method comprising:

generating a component of the audio signal at a base frequency, generating further components of the audio signal at frequencies other than the base frequency, whereby the base and the other frequencies are separated from each other by separating frequency bands in order to enhance the loudness of the audio signal, selecting phase relations of the components of the audio signal at the base frequency and at the other frequencies, and minimizing the Crest factor of the audio signal based on a Crest factor of a reference audio signal, whereby all components of the reference audio signal have the equal phase, while keeping the RMS value of the audio signal on a constant level.

10. A non-transient computer program comprising program-code means enabling to carry out the method according to claim 9, when the computer program is carried out on a computer.

11. An audio signal, embodied on a memory, the audio signal comprising:

a component of the audio signal at a base frequency, further components of the audio signal at other frequencies than the base frequency, whereby the base frequency and the other frequencies are separated from each other by separating frequency bands in order to enhance the loudness of the audio signal, characterised in that the phase relations of the components of the audio signal at the base frequency and at the other frequencies are selected such that the Crest factor is less than 80% of a Crest factor of a reference audio signal, whereby all components of the reference audio signal have the equal phase.

12. The audio system (10) according to claim 1, wherein the audio system is an audio alarm system.

13. The audio system (1) according to claim 1, characterized in that the decreased Crest factor is less than 60% of a Crest factor of a reference audio signal, whereby all components of the reference audio signal have the equal phase.

14. The audio system (1) according to claim 1, characterized in that the decreased Crest factor is less than 40% of a Crest factor of a reference audio signal, whereby all components of the reference audio signal have the equal phase.

15. The audio system (1) according to claim 1, characterized in that the further frequencies are harmonics of a selection of the base frequency.

16. The audio system (1) according to claim 1, characterised in that all frequencies are arranged below 8 kHz.

17. A non-transitory computer readable medium comprising program-code for carrying out the method according to claim 9, when the computer program is executed out on an audio system.

* * * * *